United States Patent
Ugaji et al.

(10) Patent No.: US 7,638,236 B2
(45) Date of Patent: Dec. 29, 2009

(54) POSITIVE ELECTRODE FOR LITHIUM ION BATTERY AND LITHIUM ION BATTERY USING SAME

(75) Inventors: Masaya Ugaji, Osaka (JP); Shinji Mino, Osaka (JP); Yasuyuki Shibano, Osaka (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 104 days.

(21) Appl. No.: 11/794,089

(22) PCT Filed: Dec. 28, 2005

(86) PCT No.: PCT/JP2005/024026

§ 371 (c)(1), (2), (4) Date: Jun. 25, 2007

(87) PCT Pub. No.: WO2006/073104

PCT Pub. Date: Jul. 13, 2006

(65) Prior Publication Data

US 2007/0292759 A1     Dec. 20, 2007

(30) Foreign Application Priority Data

Jan. 6, 2005    (JP) .............................. 2005-001199

(51) Int. Cl.
    *H01M 6/04*    (2006.01)
(52) U.S. Cl. .................. 429/126; 429/231.3; 429/223; 429/224; 429/231.1; 429/218.1; 427/58
(58) Field of Classification Search ............ 429/218.1, 429/223, 224, 231.1, 231.3, 126; 427/58
See application file for complete search history.

(56) References Cited

U.S. PATENT DOCUMENTS

| 5,597,660 A | 1/1997 | Bates et al. |
| 7,419,746 B2 * | 9/2008 | Ugaji et al. ................. 429/322 |
| 2006/0216611 A1 | 9/2006 | Ugaji et al. |

FOREIGN PATENT DOCUMENTS

| EP | 1 675 206 A1 | 6/2006 |
| JP | 2003-338321 | 11/2003 |
| JP | 2004-335455 | 11/2004 |
| JP | KR 2004098139 | * 11/2004 |
| JP | 2005-38844 | * 2/2005 |

* cited by examiner

*Primary Examiner*—Laura S Weiner
(74) *Attorney, Agent, or Firm*—McDermott Will & Emery LLP

(57) ABSTRACT

A positive electrode for a lithium ion battery has a conductive collector, a positive electrode active material layer being contact with the collector, and a cover layer disposed on at least part of the surface of the positive electrode active material layer. The positive electrode active material layer has a compound containing at least one kind selected from a group of cobalt, nickel, and manganese as a component. The cover layer is made of a compound with lithium ion conductivity that is expressed by general formula $Li_xPT_yO_z$ or $Li_aMO_bN_c$ and has high moisture resistance.

3 Claims, 3 Drawing Sheets

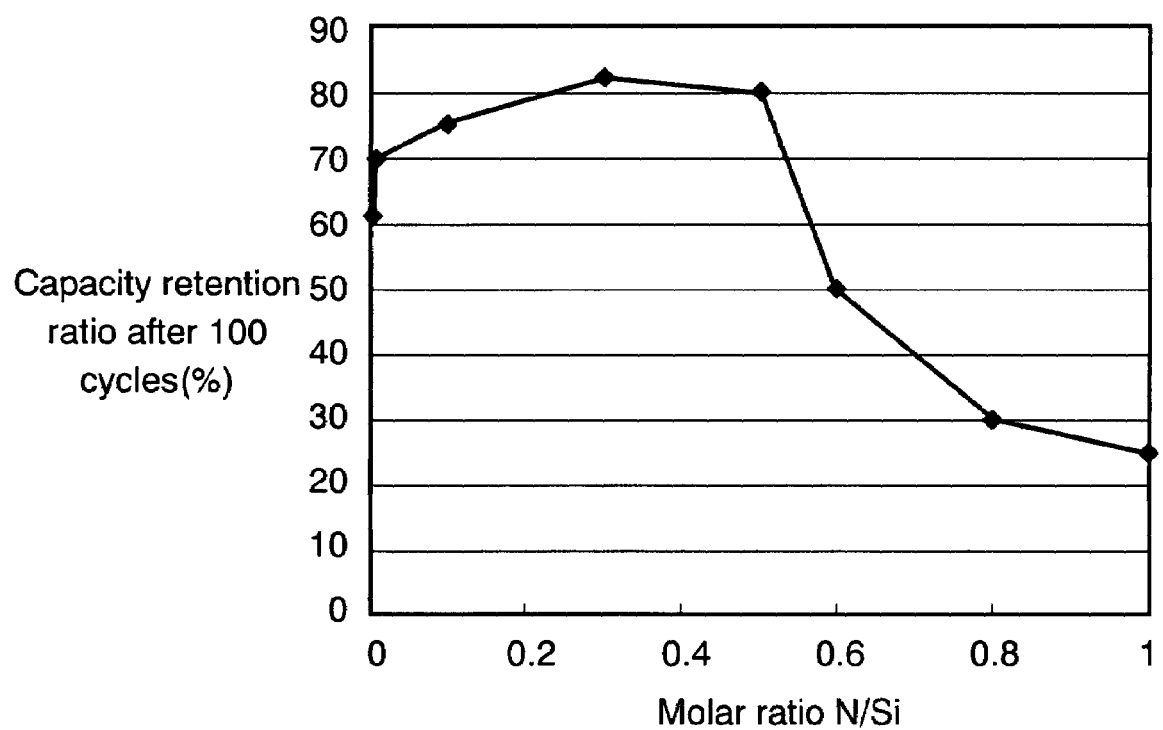

US 7,638,236 B2

POSITIVE ELECTRODE FOR LITHIUM ION BATTERY AND LITHIUM ION BATTERY USING SAME

RELATED APPLICATIONS

This application is the U.S. National Phase under 35 U.S.C. § 371 of International Application No. PCT/JP2005/024026, filed on Dec. 28, 2005, which in turn claims the benefit of Japanese Application No. 2005-001199, filed on Jan. 6, 2005, the disclosures of which Applications are incorporated by reference herein.

TECHNICAL FIELD

The present invention relates to a positive electrode for a lithium ion battery having a conductive collector and a positive electrode active material layer that is in contact with the collector and has a compound containing, as a component, at least one element selected from a group of cobalt (Co), nickel (Ni), and manganese (Mn), and relates to a lithium ion battery using the positive electrode.

BACKGROUND ART

In recent years, the demand for a battery as a power supply for portable devices has been increasing with the development of the portable devices such as a personal computer and a mobile phone. Such an application requires the battery to be used at a room-temperature and to have a large energy density and superior cycling characteristics.

For such a demand, nonaqueous electrolyte lithium batteries employing lithium ions as charge-transfer media have been developed using various types of nonaqueous electrolytes. The nonaqueous electrolytes include, for example, organic electrolyte, gel polymer electrolyte in which organic electrolyte is non-fluidized using polymer or gelling agents, and solid electrolyte. Further, materials with a high reversible electric potential for reversibly storing and releasing lithium ions from/to various types of electrolytes are discovered, and are used as positive electrode active material. These materials include, for example, lithium cobaltate ($LiCoO_2$), lithium nickelate ($LiNiO_2$), and lithium manganate ($LiMn_2O_4$). Meanwhile, elementary substances, alloys, or compounds with a low reversible electric potential, such as graphite or various types of carbon material, are discovered, and are used as negative electrode active material. Furthermore, a lithium battery has been developed that employs these materials for storing and releasing lithium ions as active materials.

As the function of the portable devices has been improved, the power supply has been required to have energy density larger than ever. This requirement is intended to be satisfied by increasing the charge voltage per single cell of battery. In this case, oxidative decomposition of the electrolyte becomes a problem. When charge and discharge are repeated, by-products are deposited on an interface between the positive electrode and the electrolyte, and hence the battery performance is reduced, disadvantageously.

In order to address the problem, Japanese Patent Unexamined Publication No. 2003-338321, for example, discloses a technology of suppressing the oxidative decomposition of the electrolyte by previously forming a film of inorganic solid electrolyte between a positive electrode material and an electrolyte. An example of the inorganic solid electrolyte is lithium phosphate ($Li_3PO_4$) or lithium phosphorus oxynitride (LIPON). Such a structure can suppress degradation reaction of the electrolyte, and can keep the battery characteristics even when the charge and discharge are repeated or the charge voltage is increased.

Electrolyte generally has a minuscule amount of residual moisture at 10 ppm level that cannot be removed easily. Here, when above-mentioned $Li_3PO_4$ and LIPON come into contact with the moisture—even if their amounts are very small—, phosphorus (P) originally existing as positive pentavalent is reduced to phosphorus with a small oxidation number. Consequently, $Li_3PO_4$ and LIPON are decomposed, significantly decreasing the ion conductivity. As a result, side reaction occurs on the interface between the positive electrode and the electrolyte which has been suppressed by the existence of the inorganic solid electrolyte, gas ($CO_2$ or the like) is generated by decomposition of the electrolyte, or by-products (lithium alkoxide or phosphate) after the decomposition are deposited. Therefore, the battery performance is decreased.

SUMMARY OF THE INVENTION

The present invention suppresses degradation of the characteristics of a battery by securing the stability against residual moisture in the electrolyte, and the ion conductivity. In order to address the above-mentioned problem, the positive electrode for a lithium ion battery (sometimes hereinafter referred to as "positive electrode") of the present invention has a conductive collector; a positive electrode active material layer that is in contact with the collector and has a compound containing at least one element selected from a group of cobalt (Co), nickel (Ni), and manganese (Mn) as a component; and a cover layer composed of an inorganic compound with lithium ion conductivity (sometimes hereinafter referred to as "inorganic compound") on at least part of the surface of the positive electrode active material layer. The cover layer has a chemical composition expressed by one of general formulas I and 2 described below:

general formula (1): $Li_xPT_yO_z$, where T refers to at least one transition metal element selected from the element group composed of titanium (Ti), copper (Cu), zirconium (Zr), molybdenum (Mo), cobalt (Co), nickel (Ni), manganese (Mn), tantalum (Ta), and tungsten (W), and x, y, and z satisfy $2.0 \leq x \leq 7.0$, $0.01 \leq y \leq 1.0$, and $3.5 \leq z \leq 8.0$, preferably $2.0 \leq x \leq 3.0$, $0.01 \leq y \leq 0.50$, and $3.5 \leq z \leq 4.0$;

general formula (2): $Li_aMO_bN_c$, where M refers to at least one element selected from the element group composed of element symbols Si, B, Ge, Al, C, Ga, and S, and a, b, and c satisfy $0.6 \leq a \leq 1.0$, $1.05 \leq b \leq 1.99$, and $0.01 \leq c \leq 0.5$; $1.6 \leq a \leq 2.0$, $2.05 \leq b \leq 2.99$, and $0.01 \leq c \leq 0.5$; $1.6 \leq a \leq 2.0$, $3.05 \leq b \leq 3.99$, and $0.01 \leq c \leq 0.5$; or $4.6 \leq a \leq 5.0$, $3.05 \leq b \leq 3.99$, and $0.01 \leq c \leq 0.5$.

These compounds composing the cover layer have high lithium ion conductivity and high moisture resistance. Therefore, the reduction of the lithium ion conductivity is suppressed even if the cover layer comes into contact with the electrolyte having residual moisture. When a positive electrode having such a cover layer is used on at least part of the surface of the positive electrode active material layer, the degradation reaction (oxidative decomposition) of the electrolyte is suppressed. Since the reduction of the lithium ion conductivity is suppressed, the battery characteristics remain superior over a long period of charge/discharge cycles.

A lithium ion battery (hereinafter referred to as "battery") of the present invention is a battery employing the positive electrode of the present invention. Thanks to this structure, stability of the positive electrode against moisture is improved, and the cycling characteristics of a battery using such a positive electrode can be improved.

BRIEF DESCRIPTION OF DRAWINGS

FIG. 5 illustrates a relationship between the N/Si of the composition in a cover layer and capacity retention ratio in accordance with a second exemplary embodiment of the present invention.

DETAILED DESCRIPTION OF PREFERRED EMBODIMENTS

Exemplary embodiments of the present invention will be described hereinafter with reference to accompanying drawings. The present invention is not limited to the following contents as long as it is based on the basic features described in this description.

First Exemplary Embodiment

In the first exemplary embodiment, an inorganic compound with lithium ion conductivity expressed by general formula (1) is used as a cover layer of a positive electrode active material layer.

Figure 1:
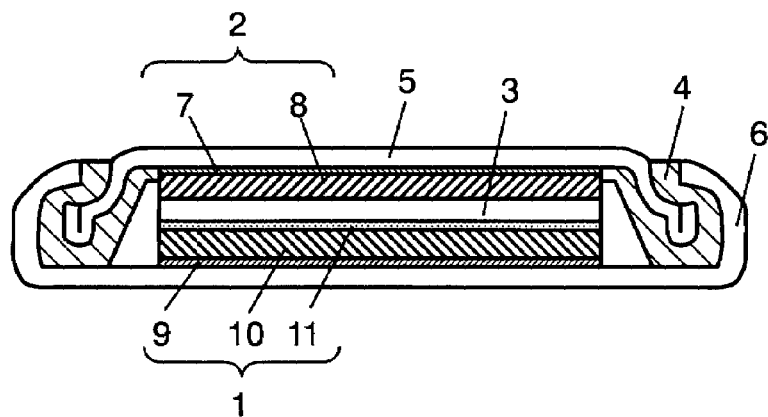
FIG. 1 is a schematic sectional view illustrating a basic structure of a battery and a positive electrode used therefor in accordance with first and second exemplary embodiments of the present invention.

FIG. 1 is a schematic sectional view of a coin battery using a positive electrode in accordance with the first exemplary embodiment. The battery has positive electrode 1, negative electrode 2 that faces positive electrode 1 and releases lithium ions during discharge, and electrolyte 3 that is interposed between positive electrode 1 and negative electrode 2 and conducts lithium ions. Positive electrode 1 and negative electrode 2 are accommodated along with electrolyte 3 in case 6 using gasket 4 and lid 5.

Negative electrode 2 is composed of negative electrode collector 7 and negative electrode active material layer 8 that is disposed on negative electrode collector 7 and includes negative electrode active material. Lid 5 may also serve as negative electrode collector 7.

Positive electrode 1 has conductive collector 9, positive electrode active material layer 10 that is disposed on collector 9 and includes positive electrode active material, and cover layer 11 that is formed on the surface of positive electrode active material layer 10 and is composed of an inorganic compound with lithium ion conductivity. Case 6 may also serve as collector 9.

Positive electrode active material layer 10 is composed of a compound (oxide) or the like containing at least one element selected from a group of cobalt (Co), nickel (Ni), and manganese (Mn) as its component. Here, this compound works as the positive electrode active material for storing and releasing lithium ions. More specifically, positive electrode active material layer 10 is composed of $LiCoO_2$, $LiNiO_2$, $LiMn_2O_4$, $LiNi_xCo_{1-x}O_2$ (0<x<1), $LiAl_xNi_{1-x}O_2$ (0<x<1), $LiMn_xNi_{1-x}O_2$ (0<x<1), $LiNi_xMn_{2-x}O_4$ (0<x<1), $LiCo_xMn_{2-x}O_4$ (0<x<1), or $LiCo_{1-x}Mg_xO_4$ (0<x<1).

Collector 9 may be a substantially chemically stable electronic conductor in a produced battery. As the material thereof, aluminum or an aluminum alloy can be generally used, for example. Additionally, stainless steel, nickel, titanium, carbon, or conductive resin can be used.

Cover layer 11 is composed of a compound having the chemical composition expressed by $Li_xPT_yO_z$. Here, T refers to at least one transition metal element selected from the element group of element symbols Ti, Cu, Zr, Mo, Co, Ni, Mn, Ta, and W, and x, y, and z satisfy $2.0 \leq x \leq 7.0$, $0.01 \leq y \leq 1.0$, and $3.5 \leq z \leq 8.0$, preferably $2.0 \leq x \leq 3.0$, $0.01 \leq y \leq 0.50$, and $3.5 \leq z \leq 4.0$, or $2.0 \leq x \leq 3.0$, $0.01 \leq y \leq 1.0$, and $3.5 \leq z \leq 7.0$. $Li_xPT_yO_z$ is material superior in lithium ion conductivity and moisture resistance, and is discovered by the inventors of the present invention as disclosed in Japanese Patent Unexamined Publication No. 2004-335455.

Here, transition metal element T may refer to not only above elements but also at least one element selected from the element group composed of vanadium (V), chrome (Cr), iron (Fe), niobium (Nb), ruthenium (Ru), silver (Ag), platinum (Pt), and gold (Au). These transition metal elements have a property similar to those of Ti, Cu; Zr, Mo, Co, Ni, Mn, Ta, and W, and it can be reasonably estimated that similar advantages can be obtained when any of these elements is added.

$Li_xPT_yO_z$ of cover layer 11 is composed of element components of lithium phosphate and transition metal element T. When this compound comes into contact with water molecules, transition metal element T is considered to be reduced in preference to phosphorus atoms. Consequently, decomposition of the lithium phosphate component is suppressed, and hence decrease in ion conductivity of cover layer 11 is suppressed.

In $Li_xPT_yO_z$, it is enough that reduction of phosphorus is suppressed by existence of transition metal element T. Therefore, transition metal element T may be introduced into lithium phosphate at the atomic level, or may be mixed with lithium phosphate at the particle level.

When transition metal element T exists as an oxide in $Li_xPT_yO_z$, transition metal element T may be partly introduced into lithium phosphate at the atomic level, or the oxide containing transition metal element T may be mixed with lithium phosphate at the particle level.

When transition metal element T exists as a lithium oxide in $Li_xPT_yO_z$, the lithium phosphate and the lithium oxide containing transition metal element T may form solid solution or may be mixed at the particle level, or the oxide containing transition metal element T may be mixed with lithium oxide at the particle level.

In order that $Li_xPT_yO_z$ sufficiently obtains a high ion conductivity and a function of suppressing decomposition of lithium-ion-conductive solid in a humid environment, x, y, and z preferably satisfy $2.0 \leq x \leq 7.0$, $0.01 \leq y \leq 1.0$, and $3.5 \leq z \leq 8.0$. When transition metal is used as a target for transition metal component T in forming $Li_xPT_yO_z$ in a thin film forming process, x, y, and z preferably satisfy $2.0 \leq x \leq 3.0$, $0.01 \leq y \leq 0.50$, and $3.5 \leq z \leq 4.0$. When transition metal oxide is used as the target, x, y, and z preferably satisfy $2.0 \leq x \leq 3.0$, $0.01 \leq y \leq 1.0$, and $3.5 \leq z \leq 7$. When lithium transition metal oxide is used as the target, x, y, and z preferably satisfy $2.0 \leq x \leq 7.0$, $0.01 \leq y \leq 1.0$, and $3.5 \leq z \leq 8.0$.

Next, configurations of respective layers forming positive electrode 1 are described. The respective layers, namely collector 9, active material layer 10, and cover layer 11, are sequentially laminated, as shown in FIG. 1. In this case, it is preferable that the surface of active material layer 10 facing electrolyte 3 is fully covered with cover layer 11, although the forming area and shape of each layer are arbitrary. More preferably, all surfaces except the contact surface of active material layer 10 with collector 9 are fully covered with cover layer 11.

FIG. 1 shows the case of a coin battery. However, in a battery structure where both surfaces of positive electrode 1 face negative electrode 2, for example, in a cylindrical battery or a flat battery having a spiral electrode group, active material layer 10 and cover layer 11 are preferably disposed on the both surfaces facing negative electrode 2.

Although the thickness of cover layer 11 is arbitrary, the thickness is preferably set at 0.01 μm to 10 μm in consideration of protection performance against a humid environment, impedance, and physical strength.

Cover layer 11 can be formed by a method of mixing $Li_xPT_yO_z$ with a binding agent such as polyvinylidene fluoride and applying them. Alternatively, cover layer 11 can be formed by a dry thin film process where lithium phosphate and either of a transition metal element such as W, Mo, Ta and the like, and a metal oxide of the transition metal element are used as a target or a deposition source. In other words, cover layer 11 is preferably formed on active material layer 10 in an argon atmosphere or vacuum environment, by means of a usual thin film forming method. The thin film forming method includes normal deposition, resistance heating deposition, high-frequency heating deposition, laser ablation deposition, ion beam deposition, sputtering or rf magnetron sputtering, for example. Instead of lithium phosphate, a mixture of $Li_2O$ and $P_2O_5$ may be used as a target or a deposition source.

In $Li_xPT_yO_z$, the valence numbers of the lithium atom, phosphorus atom, and oxygen atom are positive univalent, positive pentavalent, and negative divalent, respectively. When $Li_xPT_yO_z$ is used as a target in a thin film forming process, transition metal element T has the same valence number as in a compound state. Meanwhile, when an elementary substance of transition metal element T is used as a target, transition metal element T is considered to be introduced into lithium phosphate in a metal state.

A method of determining x, y, and z in produced $Li_xPT_yO_z$ is described below, for example. First, the ratio of phosphorus atoms is assumed to be 1. Next, the ratio of transition metal element T to phosphorus atoms is determined by an inductive coupled high-frequency plasma spectral analysis method (ICP spectral analysis method) or the like, so that y is calculated. Further, the ratio of oxygen to phosphorus atoms or transition metal atoms is determined by a method such as nitrogen oxygen analysis, so that z is calculated. In the nitrogen oxygen analysis, for example, oxygen and nitrogen contained in the material are extracted by inert gas-impulse heating fusion, namely heat decomposition in a high-temperature state. Consequently, the oxygen can be detected as CO gas with a high-sensitivity nondispersive infrared detector, and the nitrogen can be detected as $N_2$ gas with a high-sensitivity thermal conductivity detector. Value of x is calculated based on the above-mentioned valence numbers so that the entire valence number is 0.

Case 6 and other components can generally employ any material and shape that are used in a battery having a lithium compound or lithium alloy as the electrode active material.

Active material layer 8 of negative electrode 2 is made of a material capable of storing and releasing lithium ions electrochemically. This material includes, for example, lithium metal, a lithium alloy such as Li—Al, carbon material such as graphite, Sn, Si, an alloy or solid solution such as $Ni_3Sn_4$ and $Mg_2Sn$, and a compound such as $SnO_x$ (0<x<2), $SnO_2$, $SiO_x$ (0<x<2), $SiO_2$, $SiB_4$, or $SiB_6$.

Electrolyte 3 can employ electrolyte solution in which solute is dissolved in organic solvent, or a so-called polymer electrolyte layer that includes the electrolyte solution and is non-fluidized with polymer. At least when the electrolyte solution is used, a separator composed of polyethylene and the like is preferably disposed between negative electrode 2 and positive electrode 1 and is impregnated with the solution. Electrolyte 3 may be solid.

The material of electrolyte 3 is selected on the basis of an oxidation/reduction potential or the like of the active material contained in negative electrode 2. When electrolyte 3 is organic electrolyte solution, the solute suitable for use in electrolyte 3 is salts generally used in a lithium battery. The salts include, for example, lithium perchlorate ($LiClO_4$), lithium fluorobolate ($LiBF_4$), lithium hexafluorophosphate ($LiPF_6$), lithium hexafluoroarsenate ($LiAsF_6$), lithium perfluoromethyl-sulfonate ($LiCF_3SO_3$), lithium tristrifluoromethane-sulfonate ($LiC(CF_3SO_2)_3$), bistrifluoromethane-sulfonylimide lithium ($LiN(CF_3SO_2)_2$), bispentafluoroethane-sulfonylimide lithium ($LiN(C2F5SO2)$ 3), lithium fluoride, lithium chloride, lithium bromide, lithium iodide, lithium nitride, lithium phosphate, lithium silicate, lithium sulfide, or lithium phosphide.

Organic solvent for dissolving such supporting salt can employ solvent used in a lithium battery, such as a mixture of one or more substances selected from the group composed of the following substances: propylene carbonate, ethylene carbonate, diethyl carbonate, methyl ethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolan, 4-methyl-1,3-dioxolan, diethyl ether, sulfolane, acetonitrile, propylnitrile, anisole, acetate ester, and propionate ester.

When electrolyte 3 is solid, it is preferably composed of compound ($Li_xPT_yO_z$) forming cover layer 11 shown in the general formula (1).

Even when positive electrode 1 has any of the above-mentioned compositions, cover layer 11 protects active material layer 10, and suppresses the degradation reaction of electrolyte 3, thereby resulting in favorable battery characteristics.

Producing positive electrode 1 as discussed above increases the moisture resistance of positive electrode 1 and suppresses degradation of the charge/discharge cycling characteristics of a battery using positive electrode 1. Such positive electrode 1 can be applied to any lithium battery that has active material having a compound containing at least one element of the group of cobalt (Co), nickel (Ni), and manganese (Mn) capable of storing/releasing lithium. Thus, the storage stability and charge/discharge cycling characteristics thereof are improved.

When a battery is charged and discharged, the positive electrode functions as a positive electrode only after lithium ions are stored and released through cover layer 11 from active material layer 10 that is not in direct contact with electrolyte 3. In other words, cover layer 11 faces electrolyte 3 and works as a moving path of lithium ions to active material layer 10 separated from electrolyte 3. Even if electrolyte 3 includes moisture in this structure, cover layer 11 can continue working as the moving path of ions without being affected by moisture in electrolyte 3.

Active material layer 10 may be made of only active material, or may be obtained by applying a paste to collector 9 by a doctor blade method or the like after producing the paste by adding a binder and solvent to powder of the active material.

When the powder of the active material is used, cover layer 11 may be formed on part of the surfaces of the active material particles. Cover layer 11 can be formed on the surfaces of the active material particles by a dry thin film process for powder. In the dry thin film process, a transition metal defined as a T component, such as tungsten, molybdenum, and tantalum, or a metal oxide of them, and lithium phosphate are used as a target or a deposition source. In other words, cover layer 11 is preferably formed on the active material particles in an argon or vacuum environment, by means of a usual thin film forming method. The thin film forming method includes a deposition method such as normal deposition, resistance heating deposition, high-frequency heating deposition, laser ablation deposition, and ion beam deposition, for example. The thin film forming method also includes sputtering or rf magnetron sputtering, for example. Instead of lithium phosphate, a mixture of $Li_2O$ and $P_2O_5$ may be used as the target or deposition source. Active material layer 10 is produced by mixing active material particles having cover layer 11 on their surfaces with a binding agent such as polyvinylidene fluoride and by applying them to collector 9.

It is preferable in view of current characteristics that at least part of the surfaces of the active material particles is covered with cover layer 11 and lithium ion conductive polymer. The lithium ion conductive polymer can be produced by mixing lithium salt such as $LiBF_4$, $LiPF_6$, $Li(CF_3SO_2)_2N$, $LiClO_4$, $LiAsF_6$, $LiCF_3SO_3$, $LiC(CF_3SO_2)_3$, $LiN(C_2F_5SO_2)_3$ into polyether-based resin such as polyethylene oxide or polyester-based resin such as polyester terephthalate.

A method of forming the polymer layer on the active material particles having cover layer 11 on their surfaces is described below. First, powder of the polymer is produced by a method of heating and fusing the resin, dissolving the lithium salt in the heated and fused resin, cooling them, and then crushing them, or a method of drying solution of the resin and the lithium salt while injecting the solution into hot air. Next, the surfaces of the active material particles are partially or fully coated with the polymer powder. In the coating method, a mixture of the active material powder, the polymer powder, and conductive agent powder is put into a device to mechanically perform the coating. The mechanically coating method can employ a hybridization method, a mechano-fusion method, or a mechanical milling method using a planetary ball mill or a ball mill. An appropriate amount of binder and solvent, and electronic conductive material such as acetylene black or graphite if required, are added to the active material powder produced as discussed, thereby producing paste. The produced paste is applied to collector 9 thereon by a doctor blade method or the like and dried, thereby producing active material layer 10.

The first exemplary embodiment is hereinafter described in more detail using specific examples. The present invention is not limited to the examples.

EXAMPLE 1

Active material layer 10 is formed on collector 9 made of gold foil, and cover layer 11 having the chemical composition expressed by $Li_xPT_yO_z$ is formed on active material layer 10 as following way.

In samples 1 through 9, active material layer 10 made of 3-μm thick $LiCoO_2$ as the active material is formed on collector 9 made of 20-μm thick gold foil by the rf magnetron sputtering method. At this time, using $LiCoO_2$ with a diameter of 4 inches as a target, the sputtering is performed for 2 hours at an rf power of 200 W in argon atmosphere of 20 mTorr. Then, firing is performed at 800° C. for 5 hours in the air using a firing furnace to produce desired active material layer 10. The composition of produced active material layer 10 is determined by measuring a sample by the inductive coupled high-frequency plasma spectral analysis method (ICP spectral analysis method). Here, the sample has been produced by disposing a platinum plate beside collector 9 in producing active material layer 10. According to this method, the composition is determined to be $LiCoO_2$.

In sample 10, similarly to sample 1, active material layer 10 having 3-μm thick $LiNiO_2$ as the active material is formed on collector 9 made of 20-μm thick gold foil by the rf magnetron sputtering method. At this time, using $LiNiO_2$ with a diameter of 4 inches as a target, the sputtering is performed for 2 hours with an rf power of 200 W in argon atmosphere of 20 mTorr. Then, firing is performed at 800° C. for 5 hours in the air using the firing furnace to produce desired active material layer 10. The composition of produced active material layer 10 is determined by measuring a sample by the inductive coupled high-frequency plasma spectral analysis method (ICP spectral analysis method). Here, the sample has been produced by disposing a platinum plate beside collector 9 in producing active material layer 10. According to this method, the composition is determined to be $LiNiO_2$.

In sample 11, similarly to sample 1, thick active material layer 10 having 3-μm $LiMn_2O_4$ as the active material is formed on collector 9 made of 20-μm thick gold foil by the rf magnetron sputtering method. At this time, using $LiMn_2O_4$ with a diameter of 4 inches as a target, the sputtering is performed for 2 hours at an rf power of 200 W in argon atmosphere of 20 mTorr. Then, firing is performed at 800° C. for 5 hours in the air using the firing furnace to produce desired active material layer 10. The composition of produced active material layer 10 is determined by measuring a sample by the inductive coupled high-frequency plasma spectral analysis method (ICP spectral analysis method). Here, the sample has been produced by disposing a platinum plate beside collector 9 in producing active material layer 10. According to this method, the composition is determined to be $LiMn_2O_4$.

Next, for each sample, cover layer 11 made of 0.1-μm thick $Li_xPT_yO_z$ is formed on active material layer 10 by means of the rf magnetron sputtering method. At this time, $Li_3PO_4$ and transition metal element T shown in Table 1 each with a diameter of 4 inches are used as targets in samples 1 through 11. The sputtering is performed for 15 minutes in an argon atmosphere of 5 mTorr, at an rf power of 100 W for $Li_3PO_4$ or 25 W for transition metal component T. The thickness of formed cover layer 11 is approximately 0.1 μm, and the surface of active material layer 10 is covered substantially uniformly with cover layer 11. The composition of formed cover layer 11 is determined by measuring a sample by the inductive coupled high-frequency plasma spectral analysis method (ICP spectral analysis method). Here, this sample has been produced by disposing a platinum plate beside collector 9 having active material layer 10 in producing cover layer 11. According to this method, the composition is determined to be $Li_{2.8}PT_{0.2}O_{3.9}$.

In order to compare the characteristics of samples 1 through 11 with those in the conventional structure, comparative samples 1 through 3 are produced that have a layer composed of nitride of lithium phosphate (LIPON) instead of cover layer 11 of sample 1. Active material layers 10 in comparative samples 1 through 3 are the same as in samples 1, 10 and 11, respectively. In forming the LIPON layer, a method similar to that for sample 1 is used, except that a mixed gas of argon and nitrogen is used as a discharge gas and $Li_3PO_4$ is used as a target. The thickness of the LIPON layer is approximately 0.2 μm. The other conditions are the same as in samples 1, 10 and 11.

Table 1 shows the structures of samples 1 through 11, and comparative samples 1 through 3.

TABLE 1

| Sample | Active material layer | Transition metal element | Capacity retention ratio (%) |
|---|---|---|---|
| 1 | $LiCoO_2$ | W | 75.0 |
| 2 | $LiCoO_2$ | Mo | 73.7 |
| 3 | $LiCoO_2$ | Ta | 69.5 |
| 4 | $LiCoO_2$ | Ti | 70.9 |
| 5 | $LiCoO_2$ | Mn | 69.6 |
| 6 | $LiCoO_2$ | Co | 73.1 |
| 7 | $LiCoO_2$ | Ni | 72.3 |
| 8 | $LiCoO_2$ | Cu | 73.0 |
| 9 | $LiCoO_2$ | Zr | 73.5 |
| 10 | $LiNiO_2$ | W | 74.5 |
| 11 | $LiMn_2O_4$ | W | 73.3 |
| Comparative sample 1 | $LiCoO_2$ | — | 61.4 |
| Comparative sample 2 | $LiNiO_2$ | — | 59.7 |
| Comparative sample 3 | $LiMn_2O_4$ | — | 61.0 |

Next, in order to evaluate the cycling characteristics of batteries employing various types of positive electrodes 1 produced as discussed above, a coin-type secondary battery shown in FIG. 1 is produced.

Each positive electrode 1 is produced by stamping out each of the above-produced samples with a die into a disk shape with a diameter of 12.5 mm. As negative electrode 2, metal lithium (Li) is used. In this case, 0.3-mm thick metal Li is stamped out with a die into a disk shape with a diameter of 14 mm, and then press-fitted on lid 5. Collector 7 is omitted. Electrolyte 3 is prepared by mixing ethylene carbonate and ethyl methyl carbonate at a volume ratio of 1:1 and dissolving $LiPF_6$ in the mixture solvent by 1 mol/L. A micro porous film made of polyethylene is impregnated with this solution. Here, the film is usually on the market as a separator, and has a hole ratio of approximately 40% and a thickness of 30 μm. The moisture content of electrolyte 3 is measured as 12 ppm by a Karl Fischer's method.

Lid 5 including negative electrode 2 is overlaid on case 6 that includes positive electrode 1 produced above and the separator impregnated with electrolyte 3. Then, case 6 is crimped and sealed through gasket 4, thereby producing a coin-type battery with a diameter of 20 mm and a height of 1.6 mm. A shortfall of inner height (space in the battery) is compensated by inserting a stainless-steel spacer between case 6 and collector 9.

Next, each battery is stored in a thermostatic chamber that is prepared at a temperature of 20° C. and a relative humidity of 50%, and a charge/discharge cycle test is performed. During charge, each battery is firstly charged until the battery voltage reaches 4.4 V at a constant current at which the designed capacity is completely discharged in 5 hours, namely at 5-hour rate. Then, this charge manner is switched to constant voltage charge of 4.4 V, and each battery is further charged until the current drops to 5% of the constant current charge value. During discharge, constant current discharge is performed at the same current as in constant current charge until the battery voltage drops to 3 V, and the capacity is measured. In this way, the ratio of the discharge capacity during cycling to that of the first time, namely the change in capacity retention ratio, is examined. Further, the capacity retention ratios after 100 cycles are compared between samples.

Figure 2:
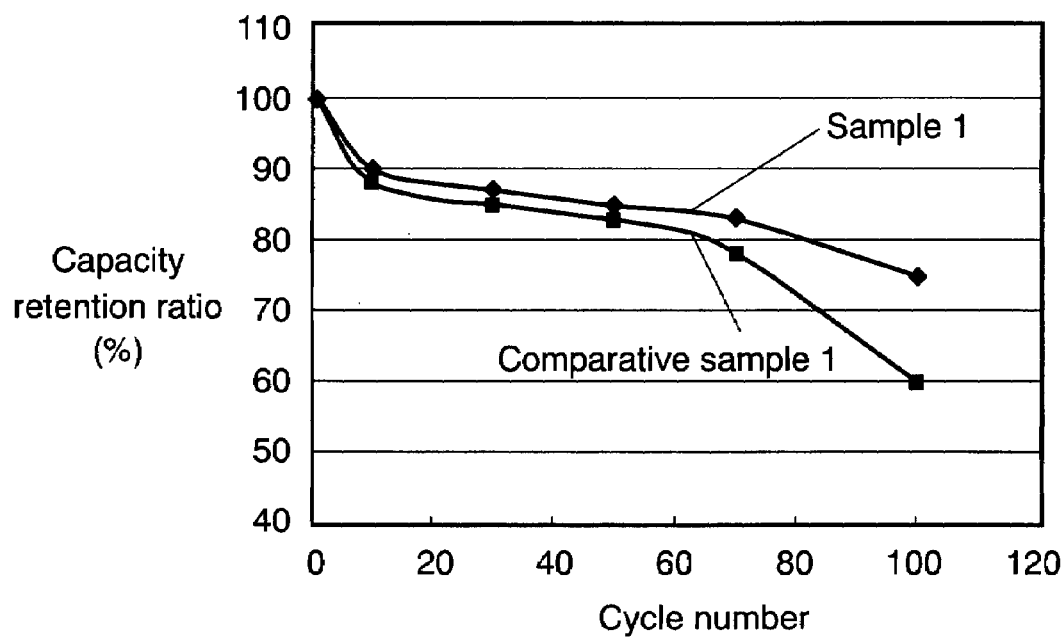
FIG. 2 is a cycling characteristic diagram in accordance with the first exemplary embodiment of the present invention.

FIG. 2 illustrates the relationship between the capacity retention ratio and cycle number (cycling characteristics) of the batteries in sample 1 and comparative sample 1. As shown in FIG. 2, the capacity retention ratio early decreases in comparative sample 1 in which cover layer 11 is formed of LIPON as a conventional ion conductor. While, in the battery of sample 1 in which tungsten W is selected as transition metal element T and cover layer 11 having the compound of general formula $Li_xPT_yO_z$ is formed, the cycling characteristics are remarkably improved comparing with comparative sample 1.

Table 1 shows the comparison result of the capacity retention ratios after 100 cycles. In comparative samples 1 through 3 employing cover layer 11 made of LIPON, the capacity retention ratios are approximately 60%. While, the batteries of samples 1 through 11 employing cover layer 11 of $Li_xPT_yO_z$ have capacity retention ratios of approximately 70% or larger even after 100 cycles, and have superior cycling characteristics.

This increase in capacity retention ratio is considered to be independent of the composition of active material layer 10, because the cycling characteristics are improved by composing cover layer 11 of a lithium-ion-conductive inorganic compound expressed by general formula $Li_xPT_yO_z$. A case where active material layer 10 has $LiCoO_2$ is examined below.

EXAMPLE 2

Next, the result of examining the range of value y in formula $Li_xPT_yO_z$ is described. Here, as an example, a case where tungsten (W) is used as transition metal element T is described.

As shown in Table 2, samples 1A through 1H are produced. In producing these samples, each cover layer 11 having composition $Li_xPW_yO_z$ of a different molar ratio of W to P (referred to as "W/P") is formed while the sputtering rf power is varied in the structure of sample 1. Value W/P corresponds to y in the composition formula. Other conditions are the same as in sample 1. Values W/P in samples 1A through 1H are 0.005, 0.01, 0.05, 0.1, 0.2, 0.5, 0.6, and 0.8.

TABLE 2

| Sample | y |
|---|---|
| 1A | 0.005 |
| 1B | 0.01 |
| 1C | 0.05 |
| 1D | 0.1 |
| 1E | 0.2 |
| 1F | 0.5 |
| 1G | 0.6 |
| 1H | 0.8 |
| Comparative sample 1 | 0 |

Figure 3:
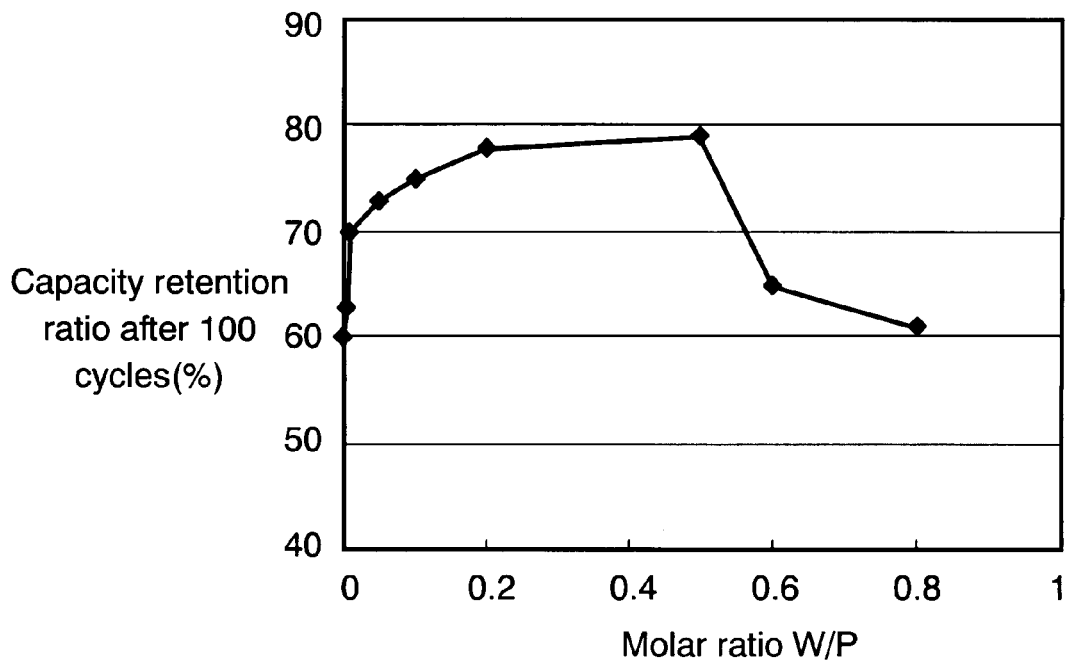
FIG. 3 illustrates a relationship between the W/P of the composition in a cover layer and capacity retention ratio in accordance with the first exemplary embodiment.

Using these samples, batteries are produced and evaluated similarly to example 1. FIG. 3 illustrates the relationship between the capacity retention ratio and W/P at the 100th cycle. This relationship is obtained when charge/discharge is performed on the same conditions as in example 1 for each battery that employs a positive electrode having $Li_xPW_yO_z$ of different molar ratio W/P (value y) in cover layer 11. As is clear from FIG. 3, the capacity retention ratio is 70% or larger at the 100th cycle in a W/P range from 0.01 to 0.5 (including the boundary values), indicating favorable characteristics.

EXAMPLE 3

Next, cases where the raw material for cover layer 11 is changed are described. A case is firstly described where each transition metal oxide listed in Table 3, instead of an elementary substance of transition metal element T, is used as a target in forming cover layer 11.

Each positive electrode 1 is produced similarly to sample 1, except that each of transition metal oxide shown listed in Table 3 is used as a target of sputtering. Batteries are produced using positive electrodes 1 of obtained samples 1J through 9J. Table 3 also shows the compositions of cover layers 11 in samples 1J through 9J. Table 3 further shows the capacity retention ratios after 100 cycles which are the result of evaluating the produced batteries on the same conditions as in example 1.

TABLE 3

| Sample | Transition metal oxide | Composition of cover layer | Capacity retention ratio (%) |
|---|---|---|---|
| 1J | $WO_3$ | $Li_{2.8}PW_{0.2}O_{4.5}$ | 70.6 |
| 2J | $MoO_3$ | $Li_{2.8}PMo_{0.2}O_{4.5}$ | 73.0 |
| 3J | $Ta_2O_5$ | $Li_{2.8}PTa_{0.2}O_{4.4}$ | 72.5 |
| 4J | $TiO_2$ | $Li_{2.8}PTi_{0.2}O_{4.3}$ | 75.2 |
| 5J | $MnO_2$ | $Li_{2.8}PMn_{0.2}O_{4.3}$ | 70.1 |
| 6J | $Co_3O_4$ | $Li_{2.8}PCo_{0.2}O_{4.17}$ | 74.5 |
| 7J | $NiO$ | $Li_{2.8}PNi_{0.2}O_{4.1}$ | 73.3 |
| 8J | $CuO$ | $Li_{2.8}PCu_{0.2}O_{4.1}$ | 73.4 |
| 9J | $ZrO_2$ | $Li_{2.8}PZr_{0.2}O_{4.3}$ | 74.6 |
| Comparative sample 1 | — | $Li_{2.8}PO_{3.45}N_{0.3}$ | 61.4 |

Active material layer: $LiCoO_2$

As is apparent from Table 3, capacity retention ratio of comparative sample 1 is 61.4%, but the batteries of samples 1J through 9J including cover layer 11 of $Li_xPT_yO_z$ have capacity retention ratios of 70% or larger even after 100 cycles, and have superior cycling characteristics. As a result, even when the target is made of transition metal oxide except for an elementary substance of transition metal, the cycling characteristics are improved.

EXAMPLE 4

Next, a case is described where each of transition metal oxide containing lithium listed in Table 4, instead of an elementary substance of transition metal element T, is used as the target in forming cover layer 11.

Positive electrode 1 is produced similarly to sample 1, except that each of transition metal oxide containing lithium listed in Table 4 is used as the target of sputtering. Batteries are produced using positive electrodes 1 of obtained samples 1K through 5K and 9K. Table 4 also shows the compositions of cover layers 11 in samples 1K through 5K and 9K. Table 4 further shows the capacity retention ratios after 100 cycles which are the result of evaluating the produced batteries on the same conditions as in example 1.

TABLE 4

| Sample | Transition metal oxide | Composition of cover layer | Capacity retention ratio (%) |
|---|---|---|---|
| 1K | $Li_2WO_4$ | $Li_{3.5}PW_{0.25}O_{5.0}$ | 74.9 |
| 2K | $Li_2MoO_4$ | $Li_{3.5}PMo_{0.25}O_{5.0}$ | 74.8 |
| 3K | $Li_3TaO_4$ | $Li_{3.75}PTa_{0.25}O_{5.0}$ | 70.8 |
| 4K | $Li_4TiO_4$ | $Li_{4.0}PTi_{0.25}O_{5.0}$ | 70.6 |
| 5K | $LiMnO_4$ | $Li_{3.25}PMn_{0.25}O_{5.0}$ | 69.2 |
| 9K | $Li_4ZrO_4$ | $Li_{4.0}PZr_{0.25}O_{5.0}$ | 73.3 |
| Comparative sample 1 | — | $Li_{2.8}PO_{3.45}N_{0.3}$ | 61.4 |

Active material layer: $LiCoO_2$

As is apparent from Table 4, comparative sample 1 has a capacity retention ratio of 61.4%, but the batteries of samples 1K through 5K and 9K including cover layer 11 of $Li_xPT_yO_z$ have capacity retention ratios of approximately 70% or larger even after 100 cycles, and have superior cycling characteristics. As a result, even when the target is made of transition metal oxide containing lithium except for an elementary substance of transition metal, the cycling characteristics are improved.

EXAMPLE 5

Next, the result of examining value y is described when transition metal oxide including lithium, instead of an elementary substance of transition metal element T, is used as the target in forming cover layer 11. Here, as an example, a case where lithium tungstate ($Li_2WO_4$) is used is described.

As shown in Table 5, samples 1KA through 1KF are produced. In producing these samples, each cover layer 11 having composition $Li_xPW_yO_z$ of a different molar ratio of W to P (referred to as "W/P") is formed while the sputtering rf power is varied in the structure of sample 1K. Value W/P corresponds to y in the composition formula. Other conditions are the same as in sample 1K. Values W/P in samples 1KA through 1KF are 0.01, 0.1, 0.25, 0.33, 1.0, and 2.0. Table 5 also shows respective compositions of cover layers 11 in samples 1KA through 1KF.

TABLE 5

| Sample | Composition of cover layer |
|---|---|
| 1KA | $Li_{3.02}PW_{0.01}O_{4.04}$ |
| 1KB | $Li_{3.2}PW_{0.1}O_{4.4}$ |
| 1KC | $Li_{3.5}PW_{0.25}O_{5.0}$ |
| 1KD | $Li_{3.66}PW_{0.33}O_{5.32}$ |
| 1KE | $Li_{5.0}PW_{1.00}O_{8.0}$ |
| 1KF | $Li_{7.0}PW_{2.00}O_{12.0}$ |

Active material layer: $LiCoO_2$

Figure 4:
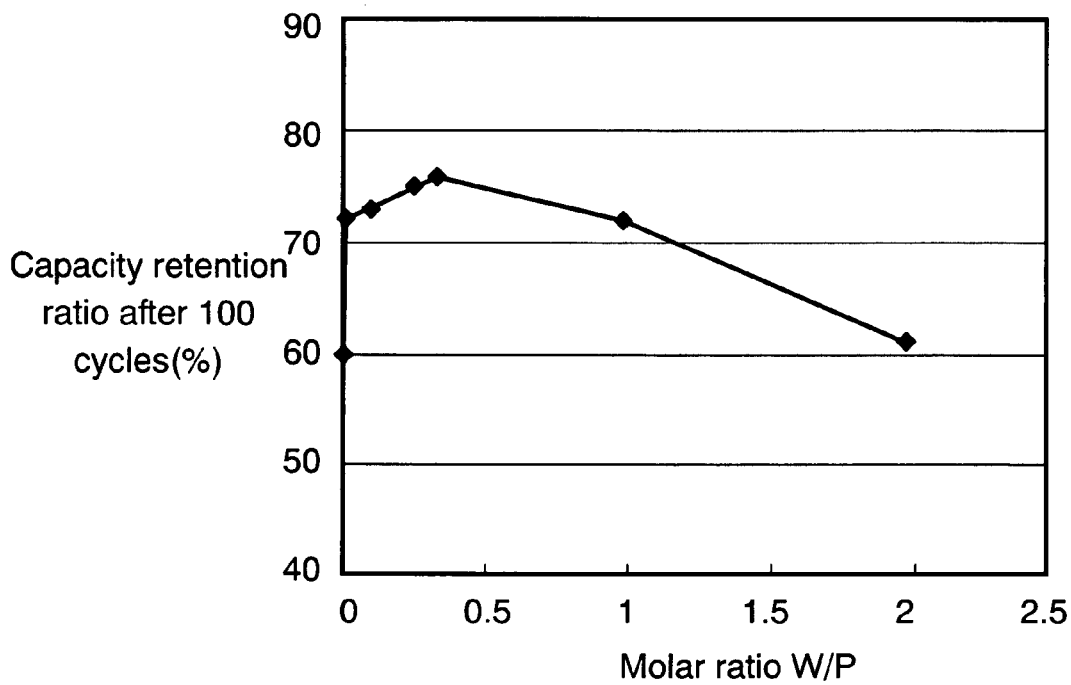
FIG. 4 illustrates another relationship between the W/P of the composition in another cover layer and capacity retention ratio in accordance with the first exemplary embodiment.

Using these samples, batteries are produced and evaluated similarly to example 1K. FIG. 4 illustrates the relationship between the capacity retention ratio and W/P after 100 cycles. Here, this relationship is obtained when charge/discharge is performed for each battery that includes positive electrode 1 having $Li_xPW_yO_z$ of different W/P in cover layer 11. As is clear from FIG. 4, the capacity retention ratio is 70% or larger in a W/P range from 0.01 to 1.0 (including the boundary values), indicating favorable characteristics.

Comparison of FIG. 3 with FIG. 4 indicates that the capacity retention ratio is lower when $Li_2WO_4$ instead of W is used as the target than when W is used as the target, even for the same W/P (i.e. value y). However, the capacity retention ratio is 70% or larger even when the W/P value is larger than 0.5 and not larger than 0.1.

Although this reason is unclear, another examination proves that the reactivity of cover layer 11 with metal lithium depends on W/P (value y). More specifically, discoloration is found for a large W/P, when $Li_xPW_yO_z$ is formed directly on the surface of metal lithium and is left in a dry air environment at a dew-point temperature of −40° C. for 2 weeks, and then the surface of the metal lithium is observed. When W is used as a target, discoloration is found for a W/P larger than 0.5. When $Li_2WO_4$ is used as a target, however, the discoloration is found for a W/P larger than 1.0. In other words, the reactivity of cover layer 11 with metal lithium is low even for a W/P larger than 0.5 and not larger than 1.0. Such a result is estimated to be obtained because lithium ions are reduced on negative electrode 2 during discharge and a similar reaction occurs.

As mentioned above, value y, namely the molar ratio of the transition metal element T component to P, is in an appropriate range. Depending on a target from which the transition metal element T component is obtained, appropriate ranges of values x and z are automatically determined according to value y. That is because the valence numbers of respective atoms are fixed as mentioned above. In other words, when the target is transition metal, x, y, and z satisfy $2.0 \leq x \leq 3.0$, $0.01 \leq y \leq 0.5$, and $3.5 \leq z \leq 4.0$. When the target is a transition metal oxide, they satisfy $2.0 \leq x \leq 3.0$, $0.010 \ y < 1.0$, and $3.5 \leq z \leq 7.0$. When the target is a transition metal oxide containing lithium, $2.0 \leq x \leq 7.0$, $0.01 \leq y \leq 1.0$, and $3.5 \leq z \leq 8.0$.

EXAMPLE 6

Active material layer 10 is formed on collector 9 made of 20-μm thick aluminum foil as follows, and cover layer 11 having composition $Li_xPW_yO_z$ is formed on active material layer 10.

Positive electrode mixture paste is prepared by sufficiently mixing the following substances:
  10 g of lithium cobaltate ($LiCoO_2$) powder with an average particle diameter of approximately 10 μm as a positive electrode active material;
  0.3 g of acetylene black as a conductive agent;
  0.8 g of polyvinylidene fluoride as a binding agent; and
  an appropriate amount of N-methyl-2-pyrrolidone (NMP).

The obtained paste is applied to one surface of electrode collector 9 made of 20-μm thick aluminum foil, dried, and roll-pressed, thereby forming active material layer 10. Then, the positive electrode is stamped out with a die into a predetermined shape.

Next, using the produced active material layer 10, 0.1-μm thick cover layer 11 having composition $Li_xPW_yO_z$ is formed by a magnetron sputtering method. At this time, using $Li_3PO_4$ and W each with a diameter of 4 inches as targets, the sputtering is performed for 15 minutes in argon atmosphere of 5 mTorr while an rf power of 100 W is applied to $Li_3PO_4$ and an rf power of 25 W is applied to W. As an rf sputtering device, a depo-down type sputtering device is used so as to hold powder. The composition of produced cover layer 11 is determined by measuring a sample by the inductive coupled high-frequency plasma spectral analysis method (ICP spectral analysis method). Here, this sample has been produced by disposing a platinum plate beside collector 9 having active material layer 10 in producing cover layer 11. The composition is determined to be $Li_{2.8}PW_{0.15}O_{3.9}$ in this method. According to cross-section observation of the positive electrode using a scanning electron microscope (SEM), the thickness of cover layer 11 is approximately 0.1 μm, and cover layer 11 substantially covers the whole surface of active material layer 10.

A coin-type secondary battery (sample 60) is produced using the obtained positive electrode by a method similar to that of example 1.

Comparative sample 4 is produced similarly to sample 60 except that LIPON is used as cover layer 11. The LIPON layer is formed by a method similar to that of sample 60, except that mixed gas of argon and nitrogen is used as a discharge gas and $Li_3PO_4$ is used as a target.

When the capacity retention ratios of sample 60 and comparative sample 4 after 100 cycles are measured by a method similar to that of example 1, the capacity retention ratio of sample 60 is 64% and that of comparative sample 4 is 58%. Therefore, the structure of the present invention improves the capacity retention ratio.

Second Exemplary Embodiment

In the second exemplary embodiment, an inorganic compound with lithium ion conductivity expressed by the general formula (2) is used as a cover layer of a positive electrode.

A conceptual diagram illustrating the basic structure of the second embodiment of the present invention is the same as FIG. 1. Cover layer 11 on positive electrode 1 of the second embodiment is composed of a compound having the chemical composition expressed by $Li_aMO_bN_c$. Component element M is at least one element selected from the element group of silicon (Si), boron (13), germanium (Ge), aluminum (Al), carbon (C), gallium (Ga), and sulfur (S). Values a, b, and c satisfy $0.6 \leq a \leq 1.0$, $1.05 \leq b \leq 1.99$, and $0.01 \leq c \leq 0.5$; $1.6 \leq a \leq 2.0$, $2.05 \leq b \leq 2.99$, and $0.01 \leq c \leq 0.5$; $1.6 \leq a \leq 2.0$, $3.05 \leq b \leq 3.99$; $0.01 \leq c \leq 0.5$; or $4.6 \leq a \leq 5.0$, $3.05 \leq b \leq 3.99$, and $0.01 \leq c \leq 0.5$. Compound $Li_aMO_bN_c$ is also material superior in lithium ion conductivity and moisture resistance, and is discovered by the inventors of the present invention as disclosed in Japanese Patent Unexamined Publication No. 2005-38844.

Bonding between component element M and oxygen in LiaMObNc is thermodynamically stabler than that between phosphorus and oxygen in lithium phosphorus oxynitride. Consequently, this composition keeps the structure of the solid electrolyte stably even when it comes into contact with water molecules, and suppresses the decrease in lithium ion conductivity in a humid environment. Using this compound as cover layer 11 allows strong protection of active material layer 10.

Cover layer 11 of $Li_aMO_bN_c$ is produced by a dry thin film process. In this dry thin film process, a compound of lithium phosphate base and a lithium oxyacid salt such as $Li_2SiO_3$, $LiBO_2$, $LiAlO_2$, $Li_5AlO_4$, $Li_2GeO_3$, $LiGaO_2$, $Li_2SO_4$, or $Li_2CO_3$ which further contains component element M are used as a target or a deposition source. In other words, cover layer 11 is preferably formed on active material layer 10 in an argon atmosphere or vacuum environment, by means of a usual thin film forming method. The thin film forming method includes a deposition method such as normal deposition, resistance heating deposition, high-frequency heating deposition, laser ablation deposition, and ion beam deposition, for example. The thin film forming method further includes sputtering or rf magnetron sputtering, for example. Element N is preferably introduced by substituting nitrogen atoms for part of oxygen atoms using a sputtering method having nitrogen gas or a deposition method in a nitrogen atmosphere. Instead of lithium oxyacid salt, $Li_2O$ and an oxide of element M such as $SiO_2$, $GeO_2$, $B_2O_3$, $Al_2O_3$, $Ga_2O_3$ or a mixture of them may be used as a target.

As described above, compound $Li_aMO_bN_c$ allows bonding between component M and oxygen to be stabler than that between phosphorus and oxygen in lithium phosphorus oxynitride even in a humid environment. Meanwhile, $Li_aMO_bN_c$ is required to present preferable ion conductivity.

From such a viewpoint, when the lithium oxyacid salt is $LiBiO_2$, $LiAlO_2$, or $LiGaO_2$, namely, when M is Bi, Al, or Ga in the general formula (2), a, b, and c preferably satisfy $0.6 \leq a \leq 1.0$, $1.05 \leq b \leq 1.99$, and $0.01 \leq c \leq 0.5$.

When the lithium oxyacid salt is $Li_2SiO_3$, $Li_2GeO_3$, or $Li_2CO_3$, namely when M is Si, Ge, or C in the general formula (2), a, b, and c preferably satisfy $1.6 \leq a \leq 2.0$, $2.05 \leq b \leq 2.99$, and $0.01 \leq c \leq 0.5$.

When the lithium oxyacid salt is $Li_2SO_4$, namely when M is S in the general formula (2), a, b, and c preferably satisfy $1.6 \leq a \leq 2.0$, $3.05 \leq b \leq 3.99$, and $0.01 \leq c \leq 0.5$.

When the lithium oxyacid salt is $Li_5AlO_4$, namely when M is Al in the general formula (2), a, b, and c preferably satisfy $4.6 \leq a \leq 5.0$, $3.05 \leq b \leq 3.99$, and $0.01 \leq c \leq 0.5$.

Values a and b can be varied depending on the amount and kind of lithium oxyacid salt to be used as raw material, and c can be varied depending on the amount and pressure of nitrogen in forming cover layer 11. From the viewpoint of ion conductivity, the range of c is particularly important. A problem of ion conductivity occurs for c smaller than 0.01, and the framework structure is apt to be broken for c larger than 0.5. The ion conductivity is damaged in either case.

In $Li_aMO_bN_c$, the valence numbers of the lithium atom and oxygen atom are positive univalent and negative divalent, respectively. The valence number of the nitrogen atom is negative trivalent. Element M has the same valence number as that of a compound used as the target.

An example of a method for determining a, b, and c in produced $Li_aMO_bN_c$ is described below. First, the ratio of element M is assumed to be 1. Next, the ratios of oxygen atoms and nitrogen atoms to element M, namely b and c, are calculated by nitrogen oxygen analysis (inert gas-impulse heating fusion method) or the like. Using the above-mentioned valence number as value a, values b and c are calculated so that the entire valence number is 0.

The other conditions such as the forming method of active material layer 10, the configuration of collector 9, the forming method or thickness of cover layer 11 are the same as in the first exemplary embodiment.

The second exemplary embodiment is hereinafter described in more detail using specific examples. The present invention is not limited to the following examples.

EXAMPLE 7

As an example, positive electrode active material layer 10 made of $LiCoO_2$ is formed on collector 9 made of aluminum, and cover layer 11 made of $Li_aMO_bN_c$ is formed on positive electrode active material layer 10, similarly to sample 1 of example 1.

In order to form cover layer 11, lithium oxyacid salts listed in Table 6 are used as respective targets, and sputtering is performed using nitrogen gas by an rf magnetron sputtering method. The conditions for sputtering are set as following: inner pressure of 2.7 Pa; gas flow rate of 10 sccm; high-frequency radiation power of 200 W; and sputtering time of 20 minutes. The thickness of obtained cover layer 11 is approximately 0.15 μm. Table 6 shows the compositions of cover layers 11 in respective samples.

TABLE 6

| Sample | Lithium oxyacid salt | Composition of cover layer | Capacity retention ratio (%) |
|---|---|---|---|
| 21 | $Li_2SiO_3$ | $Li_{1.8}SiO_{2.45}N_{0.3}$ | 79.5 |
| 22 | $LiBO_2$ | $Li_{0.8}BO_{1.45}N_{0.3}$ | 73.9 |
| 23 | $Li_2GeO_3$ | $Li_{1.8}GeO_{2.45}N_{0.3}$ | 70.6 |
| 24 | $LiAlO_2$ | $Li_{0.8}AlO_{1.45}N_{0.3}$ | 76.0 |
| 25 | $Li_5AlO_4$ | $Li_{4.8}AlO_{3.45}N_{0.3}$ | 79.8 |
| 26 | $Li_2CO_3$ | $Li_{1.8}CO_{2.45}N_{0.3}$ | 71.6 |
| 27 | $LiGaO_2$ | $Li_{0.8}GaO_{1.45}N_{0.3}$ | 75.8 |
| 28 | $Li_2SO_4$ | $Li_{1.8}SO_{3.45}N_{0.3}$ | 70.9 |
| Comparative sample 1 | — | $Li_{2.8}PO_{3.45}N_{0.3}$ | 59.8 |

Batteries are produced by a method similar to that of example 1 except that obtained samples 21 through 28 of positive electrode 1 are used. For comparison, a battery is produced similarly using comparative sample 1 of example 1. These batteries are evaluated on the same conditions as in example 1. As the result, the capacity retention ratios after 100 cycles of charge/discharge are shown in Table 6.

Comparative sample 1 employing cover layer 11 made of LIPON has a capacity retention ratio of 61.4%. While, batteries of samples 21 through 28 including cover layer 11 made of $Li_aMO_bN_c$ have a capacity retention ratios of 70% or larger even after 100 cycles.

EXAMPLE 8

Next, examples where cover layer 11 is formed using a mixture of two kinds of lithium oxyacid salts as a target for sputtering are described.

Samples 31 through 43 of positive electrode 1 having cover layer 11 made of nitride of lithium oxyacid salt listed in Table 7 are produced on the same conditions as those in samples 21 through 28, except that a mixture of lithium oxyacid salts (molar ratio 1:1) listed in Table 7 is used to form cover layer 11. Batteries are produced on the same conditions as in example 1 except for use of the mixture, and the cycling characteristics thereof are evaluated. The compositions of cover layers 11 and the evaluated capacity retention ratios after 100 cycles of charge/discharge are shown in Table 7.

TABLE 7

| Sample | Lithium oxyacid salt | Composition of cover layer | Capacity retention ratio (%) |
|---|---|---|---|
| 31 | $Li_4SiO_4$, $LiBO_2$ | $Li_{2.3}Si_{0.5}B_{0.5}O_{2.45}N_{0.3}$ | 80.3 |
| 32 | $Li_4SiO_4$, $Li_4GeO_2$ | $Li_{3.8}Si_{0.5}Ge_{0.5}O_{3.45}N_{0.3}$ | 84.5 |
| 33 | $Li_4SiO_4$, $Li_2CO_3$ | $Li_{2.8}Si_{0.5}C_{0.5}O_{2.95}N_{0.3}$ | 79.2 |
| 34 | $Li_4SiO_4$, $Li_2SO_4$ | $Li_{2.8}Si_{0.5}S_{0.5}O_{3.45}N_{0.3}$ | 78.7 |
| 35 | $LiBO_2$, $Li_4GeO_2$ | $Li_{2.3}B_{0.5}Ge_{0.5}O_{2.45}N_{0.3}$ | 80.4 |
| 36 | $LiBO_2$, $Li_5AlO_4$ | $Li_{2.8}B_{0.5}Al_{0.5}O_{2.45}N_{0.3}$ | 79.3 |
| 37 | $LiBO_2$, $Li_2CO_3$ | $Li_{1.3}B_{0.5}C_{0.5}O_{1.95}N_{0.3}$ | 75.1 |
| 38 | $LiBO_2$, $LiGaO_2$ | $Li_{0.8}B_{0.5}Ga_{0.5}O_{1.45}N_{0.3}$ | 77.3 |
| 39 | $LiBO_2$, $Li_2SO_4$ | $Li_{1.3}B_{0.5}S_{0.5}O_{2.45}N_{0.3}$ | 74.7 |
| 40 | $Li_4GeO_4$, $Li_2CO_3$ | $Li_{2.8}Ge_{0.5}C_{0.5}O_{2.95}N_{0.3}$ | 79.2 |
| 41 | $Li_4GeO_4$, $Li_2SO_4$ | $Li_{2.8}Ge_{0.5}S_{0.5}O_{3.45}N_{0.3}$ | 78.8 |
| 42 | $LiGaO_2$, $Li_5AlO_4$ | $Li_{2.8}Ga_{0.5}Al_{0.5}O_{2.45}N_{0.3}$ | 80.3 |
| 43 | $Li_2SO_4$, $Li_2CO_3$ | $Li_{1.8}S_{0.5}C_{0.5}O_{2.95}N_{0.3}$ | 73.5 |

As is apparent from Table 7, the batteries of samples 31 through 43 have capacity retention ratios of 70% or larger even after 100 cycles and superior cycling characteristics. Thus, in $Li_aMO_bN_c$ composing cover layer 11, component M may be composed of a plurality of elements.

EXAMPLE 9

Next, the result of examining the range of value c in composition formula $Li_aMO_bN_c$ is described. Here, a case where silicon (Si) is used as component M is described as an example.

In producing samples 21A through 21H shown listed in Table 8, cover layers 11 having composition $Li_aSiO_bN_c$ of a different molar ratio of N to Si (referred to as "N/Si") are formed by varying the nitrogen pressure in the producing method of samples 21.

Value N/Si corresponds to value c in the composition formula. Other conditions are the same as in sample 21. Table 8 shows the compositions of cover layers 11. Values N/Si of samples 21A through 21H are 0.005, 0.01, 0.1, 0.3, 0.5, 0.6, 0.8, and 1.0, respectively.

TABLE 8

| Sample | Composition of cover layer |
|---|---|
| 21A | $Li_{1.8}SiO_{2.89}N_{0.005}$ |
| 21B | $Li_{1.8}SiO_{2.88}N_{0.01}$ |
| 21C | $Li_{1.8}SiO_{2.75}N_{0.1}$ |
| 21D | $Li_{1.8}SiO_{2.45}N_{0.3}$ |
| 21E | $Li_{1.8}SiO_{2.15}N_{0.5}$ |
| 21F | $Li_{1.8}SiO_{2.00}N_{0.6}$ |
| 21G | $Li_{1.8}SiO_{1.70}N_{0.8}$ |
| 21H | $Li_{1.8}SiO_{1.40}N_{1.0}$ |

Using these samples, batteries are produced on the same conditions as in example 1, and the cycling characteristics thereof are evaluated. FIG. 5 illustrates the relationship between the capacity retention ratio and N/Si after 100 cycles. Here, this relationship is obtained when charge/discharge is performed for each battery that includes a positive electrode having $Li_aSiO_bN_c$ of different N/Si in cover layer 11. As is apparent from FIG. 5, the capacity retention ratio largely depends on N/Si, indicating an improvement effect at N/Si of 0.01 or more. The capacity retention ratio further increases as N/Si increases, and stably has the largest value at N/Si of 0.3 to 0.5. However, the capacity retention ratio sharply decreases when N/Si exceeds 0.5, and the practicality is completely lost at 0.8. From these results, N/Si has the most preferable range between 0.3 and 0.5 (including the boundary values).

Although data is not presented, a substantially similar result is obtained in the following case:

component M of $Li_aMO_bN_c$ is at least one element selected from the element group of B, Ge, Al, C, Ga, and S, other than Si; and a, b, and c satisfy $0.6 \leq a \leq 1.0$, $1.05 \leq b \leq 1.99$, and $0.01 \leq c \leq 0.5$; $1.6 \leq a \leq 2.0$, $2.05 \leq b \leq 2.99$, and $0.01 \leq c \leq 0.5$; $1.6 \leq a \leq 2.0$, $3.05 \leq b \leq 3.99$, and $0.01 \leq c \leq 0.5$; or $4.6 \leq a \leq 5.0$, $3.05 \leq b \leq 3.99$, and $0.01 \leq c \leq 0.5$.

Further, a similar result can be obtained when material other than $LiCoO_2$ is used for active material layer 10, although data is not presented.

EXAMPLE 10

A positive electrode active material layer coated with $Li_{1.8}SiO_{2.45}N_{0.3}$ is produced by a method similar to that of example 6, using $LiCoO_2$ powder with an average particle diameter of approximately 10 μm. A coin-type secondary battery (sample 70) is produced using the obtained positive electrode by a method similar to that of example 1.

Comparative sample 5 is produced similarly to sample 70 except that LIPON is used as cover layer 11. The LIPON layer is formed by a method similar to that of sample 70, except that mixed gas of argon and nitrogen is used as a discharge gas and $Li_3PO_4$ is used as a target.

When the capacity retention ratios of sample 70 and comparative sample 5 after 100 cycles are measured by a method similar to that of example 1, the capacity retention ratio of sample 70 is 67% and that of comparative sample 5 is 55%. Therefore, the structure of the present invention improves the capacity retention ratio.

INDUSTRIAL APPLICABILITY

A positive electrode for a battery related to the present invention has active material having a compound containing at least one element selected from a group of cobalt (Co), nickel (Ni), and manganese (Mn), and has a lithium-ion-conductive cover layer made of $Li_xPT_yO_z$ or $Li_aMO_bN_c$ on at least part of the surface of the active material. Using the positive electrode can largely improve the cycling characteristics in a battery employing electrolyte having a risk of mixing of a minuscule amount of moisture.

The invention claimed is:

1. A lithium ion battery comprising:
 a positive electrode for the lithium ion battery comprising:
  a conductive collector;
  a positive electrode active material layer being in contact with the collector, the positive electrode active material layer having a compound containing at least one selected from the group consisting of cobalt (Co), nickel (Ni), and manganese (Mn) as a component; and
  a cover layer made of an inorganic compound with lithium ion conductivity provided on at least part of a surface of the positive electrode active material layer,
  wherein the cover layer has a chemical composition expressed by general formula:
  $Li_aMO_bN_c$
  wherein M is at least one element selected from the group consisting of Si, B, Ge, Al, C, Ga, and S, and a, b, and c satisfy $0.6 \leq a \leq 1.0$, $1.05 \leq b \leq 1.99$, and $0.01 \leq c \leq 0.5$; $1.6 \leq a \leq 2.0$, $2.05 \leq b \leq 2.99$, and $0.01 \leq c \leq 0.5$; $1.6 \leq a \leq 2.0$, $3.05 \leq b \leq 3.99$, and $0.01 \leq c \leq 0.5$; or $4.6 \leq a \leq 5.0$, $3.05 \leq b \leq 3.99$, and $0.01 \leq c \leq 0.5$;
 an electrolyte conducting lithium ions provided separately from the cover layer; and
 a negative electrode reversibly storing and releasing lithium ions,
 wherein the cover layer is formed between the positive electrode active material layer and the electrolyte.

2. A positive electrode for a lithium ion battery comprising:
 a conductive collector;
 a positive electrode active material layer being in contact with the collector, the positive electrode active material layer having a compound containing at least one selected from the group consisting of cobalt (Co), nickel (Ni), and manganese (Mn) as a component; and
 a cover layer made of an inorganic compound with lithium ion conductivity provided on at least part of a surface of the positive electrode active material layer,
 wherein the cover layer has a chemical composition expressed by general formula:
 $Li_aMO_bN_c$,
 wherein M is at least one element selected from the group consisting of B, Ge, Al, C, Ga, and S, and a, b, and c satisfy $0.6 \leq a \leq 1.0$, $1.05 \leq b \leq 1.99$, and $0.01 \leq c \leq 0.5$;

$1.6 \leq a \leq 2.0$, $2.05 \leq b \leq 2.99$, and $0.01 \leq c \leq 0.5$;
$1.6 \leq a \leq 2.0$, $3.05 \leq b \leq 3.99$, and $0.01 \leq c \leq 0.5$; or
$4.6 \leq a \leq 5.0$, $3.05 \leq b \leq 3.99$, and $0.01 \leq c \leq 0.5$.

3. A lithium ion battery comprising:
the positive electrode for the lithium ion battery of claim 2;
an electrolyte conducting lithium ions; and
a negative electrode reversibly storing and releasing lithium ions.

* * * * *